United States Patent
Nagarajan et al.

(10) Patent No.: US 11,611,512 B2
(45) Date of Patent: Mar. 21, 2023

(54) SYSTEM TO DYNAMICALLY DETECT AND ENHANCE CLASSIFIERS FOR LOW LATENCY TRAFFIC

(71) Applicant: ARRIS Enterprises LLC, Suwanee, GA (US)

(72) Inventors: Sabarinathan Nagarajan, Bangalore (IN); Lakshmi Arunkumar, Bangalore (IN); Ian G. Wheelock, Cork (IE)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/481,759

(22) Filed: Sep. 22, 2021

(65) Prior Publication Data

US 2022/0210080 A1    Jun. 30, 2022

Related U.S. Application Data

(60) Provisional application No. 63/132,048, filed on Dec. 30, 2020.

(51) Int. Cl.
*H04L 47/2441* (2022.01)
*H04L 12/28* (2006.01)
(Continued)

(52) U.S. Cl.
CPC ...... *H04L 47/2441* (2013.01); *H04L 12/2801* (2013.01); *H04L 47/2475* (2013.01); *H04L 61/2571* (2013.01)

(58) Field of Classification Search
CPC ............ H04L 47/2441; H04L 12/2801; H04L 47/2475; H04L 61/2571
(Continued)

(56) References Cited

U.S. PATENT DOCUMENTS 10,999,137 B2 *  5/2021  Cidon ................... H04L 49/354
11,088,900 B2 *  8/2021  Ratkovic ................ H04L 67/51
(Continued)

OTHER PUBLICATIONS

M. Hawa and D. W. Petr, "Quality of service scheduling in cable and broadband wireless access systems," IEEE 2002 Tenth IEEE International Workshop on Quality of Service (Cat. No. 02EX564), 2002, pp. 247-255, doi: 10.1109/IWQoS.2002.1006593. (Year: 2002).*

(Continued)

*Primary Examiner* — Melvin H Pollack
(74) *Attorney, Agent, or Firm* — Wenderoth, Lind & Ponack, L.L.P.

(57) ABSTRACT

A network device for use with a client device and a cable modem termination system ("CMTS"), the client device being configured to run applications requiring data traffic of a first and second quality of service ("QoS"). The CMTS is configured to provide a first service flow and a second service flow to the network device. The network device provides a local area network ("LAN") for connection to the client device and a network address translation ("NAT"). The NAT is configured to map the network device IP address to the client device IP address; divide the source ports into a first range and a low latency range; assign the respective data traffic of the applications to at least one port within the first range and to at least one port within the low latency range; and modify the low latency range of source ports based on a change in data traffic.

21 Claims, 8 Drawing Sheets

(51) Int. Cl.
   *H04L 47/2475* (2022.01)
   *H04L 61/256* (2022.01)
(58) Field of Classification Search
   USPC .......................................................... 709/223
   See application file for complete search history.

(56) References Cited

U.S. PATENT DOCUMENTS

| | | | | |
|---|---|---|---|---|
| 11,171,834 | B1* | 11/2021 | Bockelmann | G06F 9/45558 |
| 11,296,953 | B1* | 4/2022 | Ponnuswamy | H04L 41/16 |
| 11,310,149 | B1* | 4/2022 | Deb | H04L 45/74 |
| 11,323,338 | B2* | 5/2022 | Karam | H04L 41/0866 |
| 11,374,847 | B1* | 6/2022 | Beacham | H04L 41/22 |
| 2013/0046863 | A1 | 2/2013 | Bastian et al. | |
| 2013/0301650 | A1 | 11/2013 | Zou et al. | |
| 2015/0058963 | A1 | 2/2015 | Michel | |
| 2017/0346707 | A1* | 11/2017 | Menon | H04L 43/0811 |
| 2018/0026893 | A1* | 1/2018 | Jeuk | H04L 47/2475 |
| | | | | 370/236 |
| 2018/0041470 | A1* | 2/2018 | Schultz | H04L 47/24 |
| 2019/0098067 | A1* | 3/2019 | Sandoval | H02J 13/00024 |
| 2019/0102719 | A1* | 4/2019 | Singh | H04L 41/5032 |
| 2019/0116111 | A1* | 4/2019 | Izard | H04L 45/745 |
| 2019/0158371 | A1* | 5/2019 | Dillon | H04L 43/087 |
| 2019/0182213 | A1* | 6/2019 | Saavedra | H04L 63/0236 |
| 2019/0319848 | A1* | 10/2019 | Johnsen | H04L 45/48 |
| 2020/0112504 | A1* | 4/2020 | Osman | H04L 47/2475 |
| 2020/0127921 | A1* | 4/2020 | Zhu | H04L 41/0663 |
| 2021/0006490 | A1* | 1/2021 | Michael | H04L 43/0864 |
| 2021/0044521 | A1* | 2/2021 | Holbrook | H04L 47/2441 |
| 2021/0083967 | A1* | 3/2021 | Joshi | H04L 43/20 |
| 2021/0112011 | A1* | 4/2021 | K S | H04L 41/40 |
| 2021/0117360 | A1* | 4/2021 | Kutch | G06F 9/5083 |
| 2021/0218571 | A1* | 7/2021 | Ansari | H04M 15/705 |
| 2022/0109717 | A1* | 4/2022 | Kleinrouweler | H04L 47/24 |

OTHER PUBLICATIONS

TR-069 CPE Wan Management Protocol, Broadband Forum, CWMP Version 1.4, Issue 1, Amendment 6, Mar. 2018. (Year: 2018).*
Harrington, D. "An Architecture for Describing Simple Network Management Protocol (SNMP) Management Frameworks," REC 3411, Dec. 2002. (Year: 2002).*
Alizadeh, Mohammad. "Less is More: Trading a Little Bandwidth for (Ultra Low) Latency in the Data Center," 9th Usenix Symposium on Networked Simple Design and Implementation NSDI 12, 2012, 253-266. (Year: 2012).*
International Search Report and Written Opinion of the International Searching Authority dated Jan. 14, 2022 in International (PCT) Application No. PCT/US2021/051513.

* cited by examiner

SYSTEM TO DYNAMICALLY DETECT AND ENHANCE CLASSIFIERS FOR LOW LATENCY TRAFFIC

BACKGROUND

Embodiments of the invention relate to dynamically detecting and enhancing classifiers for low latency traffic.

SUMMARY

Aspects of the present invention are drawn to a network device for use with a client device and a cable modem termination system ("CMTS"), the client device being configured to run a non-negative integer number n applications and to run a non-negative integer number m applications, the n applications requiring respective data traffic of a first quality of service ("QoS"), the m applications requiring respective data traffic of a second QoS, the second quality of service being higher than the first quality of service, the CMTS being configured to provide a first service flow to the network device and to provide a second service flow to the network device, the first service flow being associated with the first QoS, the second service flow being associated with the second QoS. The network device includes a memory; and a processor configured to execute instructions stored on the memory to cause the network device to: provide a local area network ("LAN") for connection to the client device; provide a network address translation ("NAT") having a network device IP address, a client device IP address, a destination port, and a plurality of source ports. The IP address is associated with the network device. The client device IP address is associated with the client device. The destination port is associated with the client device. The NAT is configured to map the network device IP address to the client device IP address for the packets from the CMTS to the client device and to map the client device IP address to the network IP address for packets from the client device to the CMTS; divide the source ports into a first range of source ports and a low latency range of source ports, the first range of source ports being mapped to the first service flow, the low latency range of source ports being mapped to the second service flow; assign the respective data traffic of the n applications to at least one port within the first range of source ports; assign the respective data traffic of the m applications to at least one port within the low latency range of source ports; and modify the low latency range of source ports based on a change in data traffic of at least one of n and m.

In some embodiments, the processor is configured to execute instructions stored on the memory to additionally cause the network device to transmit a dynamic service change signal (DSC) to the CMTS based on the change in data traffic of at least one of n and m.

In some embodiments, the processor is configured to execute instructions stored on the memory to additionally cause the network device to transmit the dynamic service change signal to the CMTS by one of the group of communication protocols consisting of a TR-069 protocol and a simple network management protocol.

In some embodiments, the dynamic service change signal instructs the CMTS to modify at least one of the first service flow and the second service flow.

In some embodiments, the dynamic service change signal instructs the CMTS to modify a classifier that classifies the second service flow.

In some embodiments, the first range of source ports is mutually exclusive from the low latency range of source ports.

In some embodiments, the change in data traffic includes a change in at least one of n and m.

Other aspects of the present disclosure are drawn to a method of using a network device with a client device and a cable modem termination system ("CMTS"), the client device being configured to run a non-negative integer number n applications and to run a non-negative integer number m applications, the n applications requiring respective data traffic of a first quality of service ("QoS"), the m applications requiring respective data traffic of a second QoS, the second quality of service being higher than the first quality of service, the CMTS being configured to provide a first service flow to the network device and to provide a second service flow to the network device, the first service flow being associated with the first QoS, the second service flow being associated with the second QoS. The method includes providing, via a processor configured to execute instructions stored on a memory, a local area network ("LAN") for connection to the client device; providing, via the processor, a network address translation ("NAT") having a network device IP address, a client device IP address, a destination port, and a plurality of source ports, the IP address being associated with the network device, the client device IP address being associated with the client device, the destination port being associated with the client device, the NAT being configured to map the network device IP address to the client device IP address for the packets from the CMTS to the client device and to map the client device IP address to the network IP address for packets from the client device to the CMTS; dividing, via the processor, the source ports into a first range of source ports and a low latency range of source ports, the first range of source ports being mapped to the first service flow, the low latency range of source ports being mapped to the second service flow; assigning, via the processor, the respective data traffic of the n applications to at least one port within the first range of source ports; assigning, via the processor, the respective data traffic of the m applications to at least one port within the low latency range of source ports; and modifying, via the processor, the low latency range of source ports based on a change in data traffic of at least one of n and m.

In some embodiments, the method further includes transmitting, via the processor, a dynamic service change signal to the CMTS based on the change in data traffic of at least one of n and m.

In some embodiments, the transmitting includes transmitting the dynamic service change signal to the CMTS by one of the group of communication protocols consisting of a TR-069 protocol and a simple network management protocol.

In some embodiments, the dynamic service change signal instructs the CMTS to modify at least one of the first service flow and the second service flow.

In some embodiments, the dynamic service change signal instructs the CMTS to modify a classifier that classifies the second service flow.

In some embodiments, the first range of source ports is mutually exclusive from the low latency range of source ports.

In some embodiments, the change in data traffic includes a change in at least one of n and m.

Other aspects of the present disclosure are drawn to a non-transitory, computer-readable media having computer-readable instructions stored thereon, the computer-readable instructions being capable of being read by a network device for use with a client device and a cable modem termination system ("CMTS"), the client device being configured to run a non-negative integer number n applications and to run a non-negative integer number m applications, the n applications requiring respective data traffic of a first quality of service ("QoS"), the m applications requiring respective data traffic of a second QoS, the second quality of service being higher than the first quality of service, the CMTS being configured to provide a first service flow to the network device and to provide a second service flow to the network device, the first service flow being associated with the first QoS, the second service flow being associated with the second QoS, wherein the computer-readable instructions are capable of instructing the network device to perform the method includes: providing, via a processor configured to execute instructions stored on a memory, a local area network ("LAN") for connection to the client device; providing, via the processor, a network address translation ("NAT") having a network device IP address, a client device IP address, a destination port, and a plurality of source ports, the IP address being associated with the network device, the client device IP address being associated with the client device, the destination port being associated with the client device, the NAT being configured to map the network device IP address to the client device IP address for the packets from the CMTS to the client device and to map the client device IP address to the network IP address for packets from the client device to the CMTS; dividing, via the processor, the source ports into a first range of source ports and a low latency range of source ports, the first range of source ports being mapped to the first service flow, the low latency range of source ports being mapped to the second service flow; assigning, via the processor, the respective data traffic of the n applications to at least one port within the first range of source ports; assigning, via the processor, the respective data traffic of the m applications to at least one port within the low latency range of source ports; and modifying, via the processor, the low latency range of source ports based on a change in data traffic of at least one of n and m.

In some embodiments, the computer-readable instructions are capable of instructing the network device to perform the method further includes transmitting, via the processor, a dynamic service change signal to the CMTS based on the change in data traffic of at least one of n and m.

In some embodiments, the computer-readable instructions are capable of instructing the network device to perform the method wherein the transmitting includes transmitting the dynamic service change signal to the CMTS by one of the group of communication protocols consisting of a TR-069 protocol and a simple network management protocol.

In some embodiments, the computer-readable instructions are capable of instructing the network device to perform the method wherein the dynamic service change signal instructs the CMTS to modify at least one of the first service flow and the second service flow.

In some embodiments, the computer-readable instructions are capable of instructing the network device to perform the method wherein the dynamic service change signal instructs the CMTS to modify a classifier that classifies the second service flow.

In some embodiments, the computer-readable instructions are capable of instructing the network device to perform the method wherein the first range of source ports is mutually exclusive from the low latency range of source ports.

In some embodiments, the computer-readable instructions are capable of instructing the network device to perform the method wherein the change in data traffic includes a change in at least one of n and m.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Figure 1A:
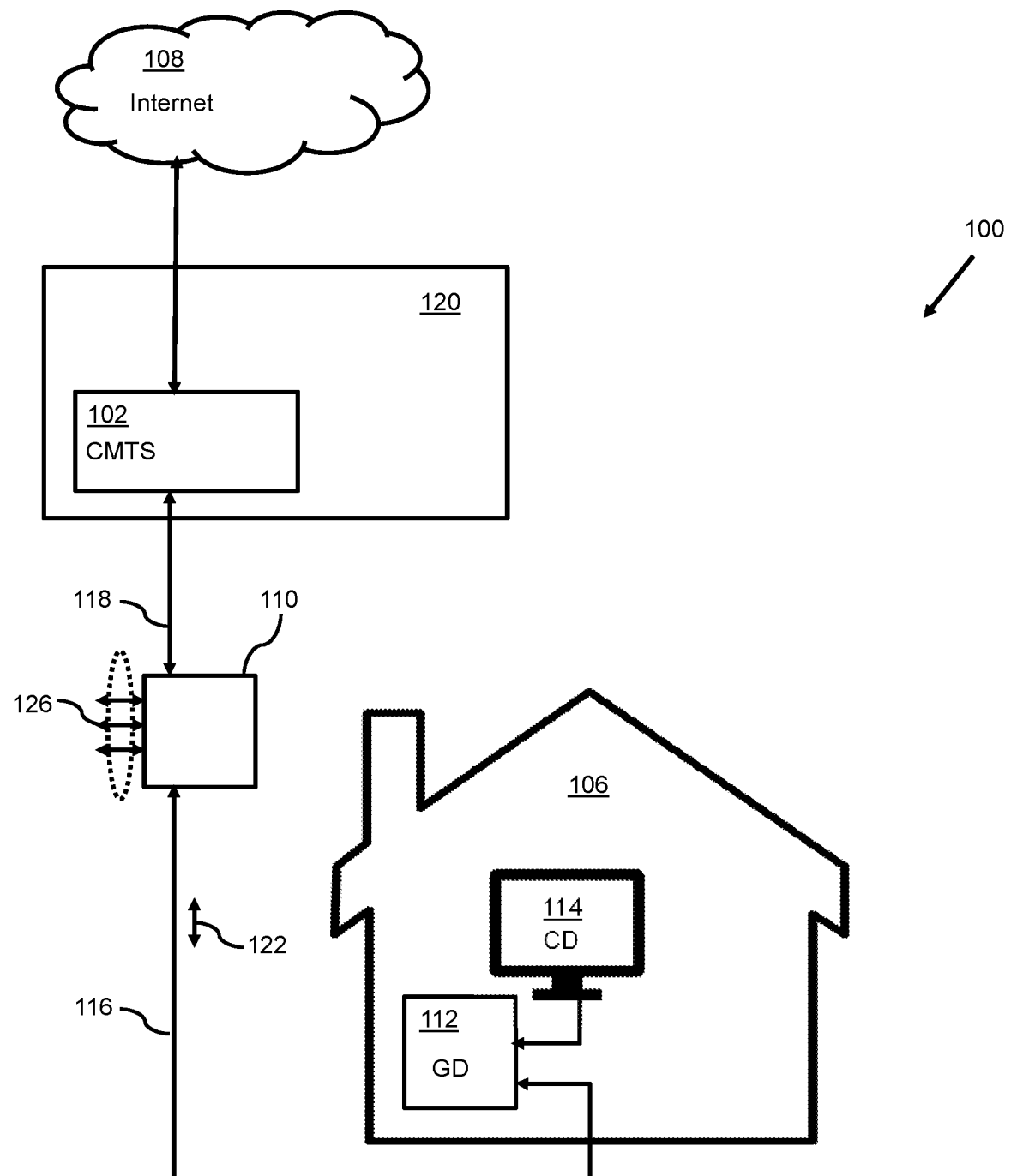
FIG. 1A illustrates an electronic communication network at a time $t_0$.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Data Over Cable Service Interface Specification (DOCSIS) is an international telecommunications standard that enables the addition of high-bandwidth data transfer to an existing cable television (CATV) system. It is used by many cable television operators to provide Internet access over their existing hybrid fiber-coaxial (HFC) infrastructure.

Many modern applications, such as online gaming, are latency-sensitive. When data packets from latency-sensitive applications are sent through a standard DOCSIS network, the data packets are queued for transmission just like data packets from regular applications. When this happens, the users of low-latency applications experience lag and an unsatisfying user experience. To improve the customer experience for users of low latency applications on DOCSIS networks, Cable Labs developed low latency DOCSIS. Low latency DOCSIS is a specification of DOCSIS that allows data traffic from low latency applications to take a different path through a DOCSIS network than data traffic from applications that don't require low latency. When low latency DOCSIS is enabled on a network, data traffic is separated into two service flows, a low latency service flow for data traffic that requires low latency, and a classic service flow for data traffic that does not require low latency. The low latency service flow and the classic service flow are combined into an Aggregate Service Flow for transmission through the network. Data traffic that is sent through the low latency service flow is sometimes referred to as non-queue building because low latency applications either don't depend on data queues or depend on very small data queues for sending data. Data traffic that is sent through the classic service flow is sometimes referred to as queue building because these applications do depend on queues to send data traffic. This traffic separation allows the data traffic requiring low latency to bypass the queue used by data traffic that does not require low latency, which results in faster passage of the low latency traffic through the network. Separating the traffic of low-latency applications from other applications greatly improves the customer experience for users of low latency applications such as online gaming.

For data traffic to be correctly separated into a low latency service flow and a classic service flow, the data traffic has to be properly classified. To do this, Internet Service Providers (ISPs) work with Multiple System Operators (MSOs) to determine how to classify data traffic and which service flows to use for the varying types of traffic being transmitted and received by a gateway device. When a gateway device is provisioned for separating low latency traffic from other traffic, the gateway device receives a configuration file that provides classifications determined by the ISP and/or the MSO. This includes setting aside a port range in the configuration file within the gateway device to filter for low latency traffic.

There are times when the classifications established by the ISPs and/or MSOs for use with a gateway device need to be modified. One example of this is if all of the ports for low latency traffic are in use and a new application is opened that also requires low latency for optimal performance. In this case, when all of the ports assigned to low latency traffic are already in use, the newly opened application would have to use ports assigned to regular traffic, and the data traffic for the newly opened application would be routed through the classic service flow. In this scenario, the user would experience lag and delay with their application. Another instance of when data traffic classifications might need to be modified is when an application is non-queue building, but the application's developer has not properly marked the data packets for the application as non-queue building. In this case, the data packets would be sent through the classic service flow when they should be sent through the low latency service flow.

In both of these situations, if the existing port range that is provisioned in the gateway device for low latency data traffic needs to be changed, it requires intervention by the MSO and/or the ISP and a possible reboot of the gateway device, which is time-consuming and very inconvenient for the consumer.

This will now be described in greater detail with reference to FIGS. 1A-B.

FIG. 1A illustrates an electronic communication network 100 at a time to. As shown in FIG. 1A, network 100 includes a residence 106 which includes a gateway device 112 and a client device 114; a communication channel 116; a communication channel 118; a service flow 122; a network node 110, a plurality of service flows 126; an MSO 120 which includes a CMTS 102; and an Internet 108.

Gateway device 112 is arranged to communicate with CMTS 102 by way of communication channel 116, network node 110, and communication channel 118. Network node 110 provides a plurality of service flows 126 to multiple home networks.

Figure 1B:
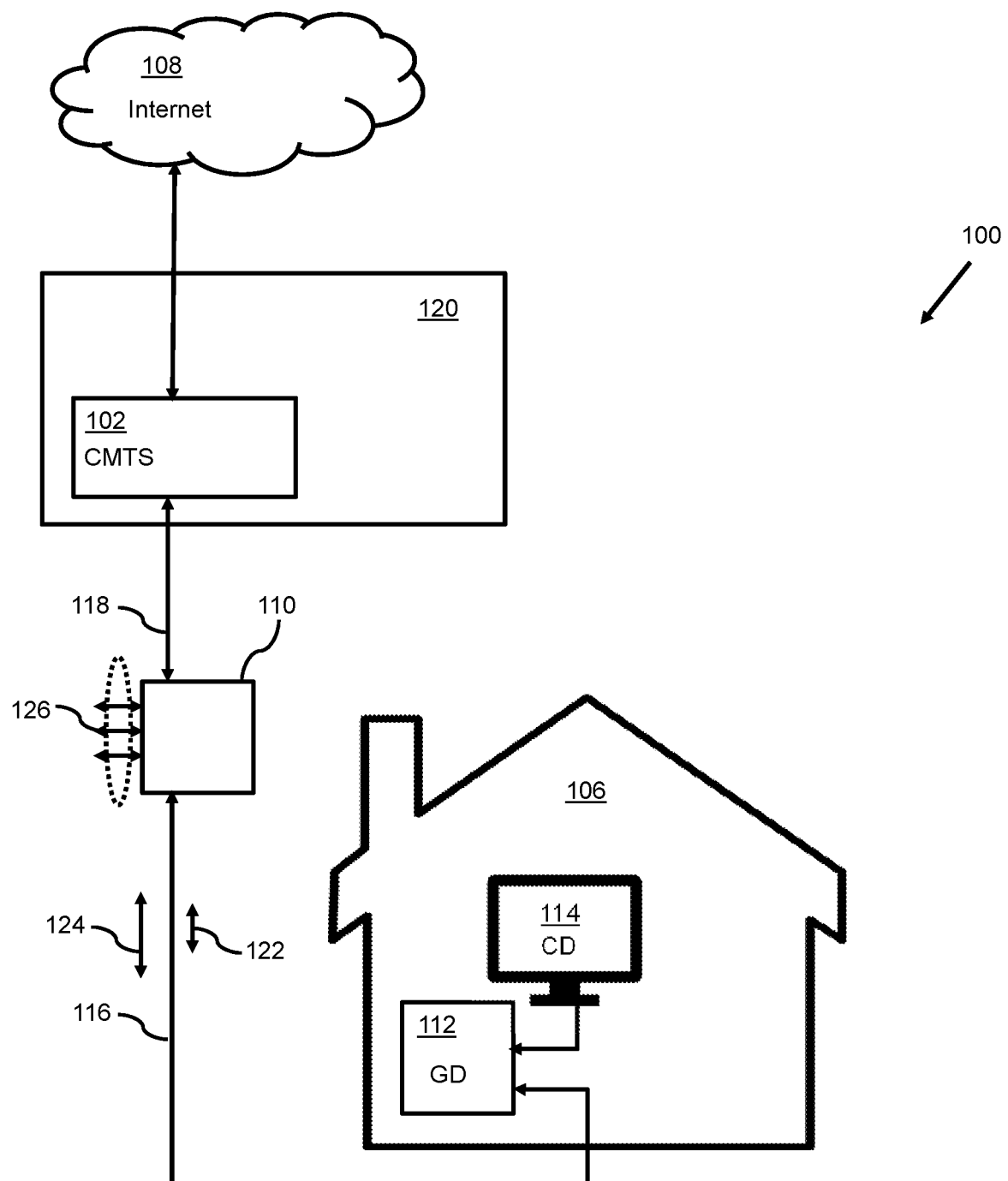
FIG. 1B illustrates an electronic communication network of FIG. 1A at a time $t_1$.

FIG. 1B further illustrates the electronic communication network 100 of FIG. 1A at a time $t_1$. As shown in FIG. 1B, at time $t_1$, communication network 100 includes all of the components illustrated in FIG. 1A with the addition of service flow 124.

For purposes of discussion, as illustrated in FIG. 1A, assume that the user of client device 114 at time $t_0$ launches a first application that sends data packets through service flow 122. Assume that service flow 122 has a "classic" quality of service for standard applications. Also assume for purposes of discussion that the application that the user has launched is an application that does not require low latency, such as video-streaming through Netflix. As a result, the user experiences no problems watching the film on Netflix.

For purposes of discussion, as illustrated in FIG. 1B, assume that the user of client device 114, at time $t_1$, launches an online gaming application that requires low latency for a decent gaming experience, assume that service flow 124 has a low latency quality of service for low latency applications, and assume that the data packets for this game are sent through service flow 124. As a result, the user does not experience any problems playing the online game because it is low latency and the data packets for the game are sent through the low latency service flow.

Then assume that the user of client device 114 decides to open a third application at the same time that the first two applications are running. And assume that this application requires low latency but that all of the ports provisioned at gateway device 112 for low latency data traffic are in use by the second application. As a result, the data packets for the third application would be transmitted through service flow 122 which would cause a lag in performance with the third application. As a result, the user of client device 114 would be frustrated with the performance of the third application and would begin searching for ways to improve its performance.

What is needed is a system to automatically detect and classify low latency traffic and modify the classifiers provisioned in the gateway device when needed to accommodate low latency data traffic so that it can be sent through the low latency service flow without intervention from the user or the ISP or the MSO.

In accordance with aspects of the present disclosure, a low latency controller is provisioned at an MSO. The low latency controller maintains a port range map which defines a range of source ports to be used for applications requiring low latency and a source port range for applications that do not require low latency. The data from the low latency controller is provided to the gateway device located at the customer's site and the CMTS located at the MSO in the form of a configuration file. When the gateway device indicates that an application has been improperly classified, it notifies the low latency controller through a DSC request. The low latency controller then updates its port range map with the proper classification for the application and sends the updated information to the gateway device and the CMTS. Future data packets for the application are then properly classified and sent through the correct service flow, and the user experiences greatly improved performance with the application.

An example system and method for dynamically detecting and classifying data traffic in accordance with aspects of the present disclosure will now be described in greater detail with reference to FIGS. 2A-4.

Figure 2A:
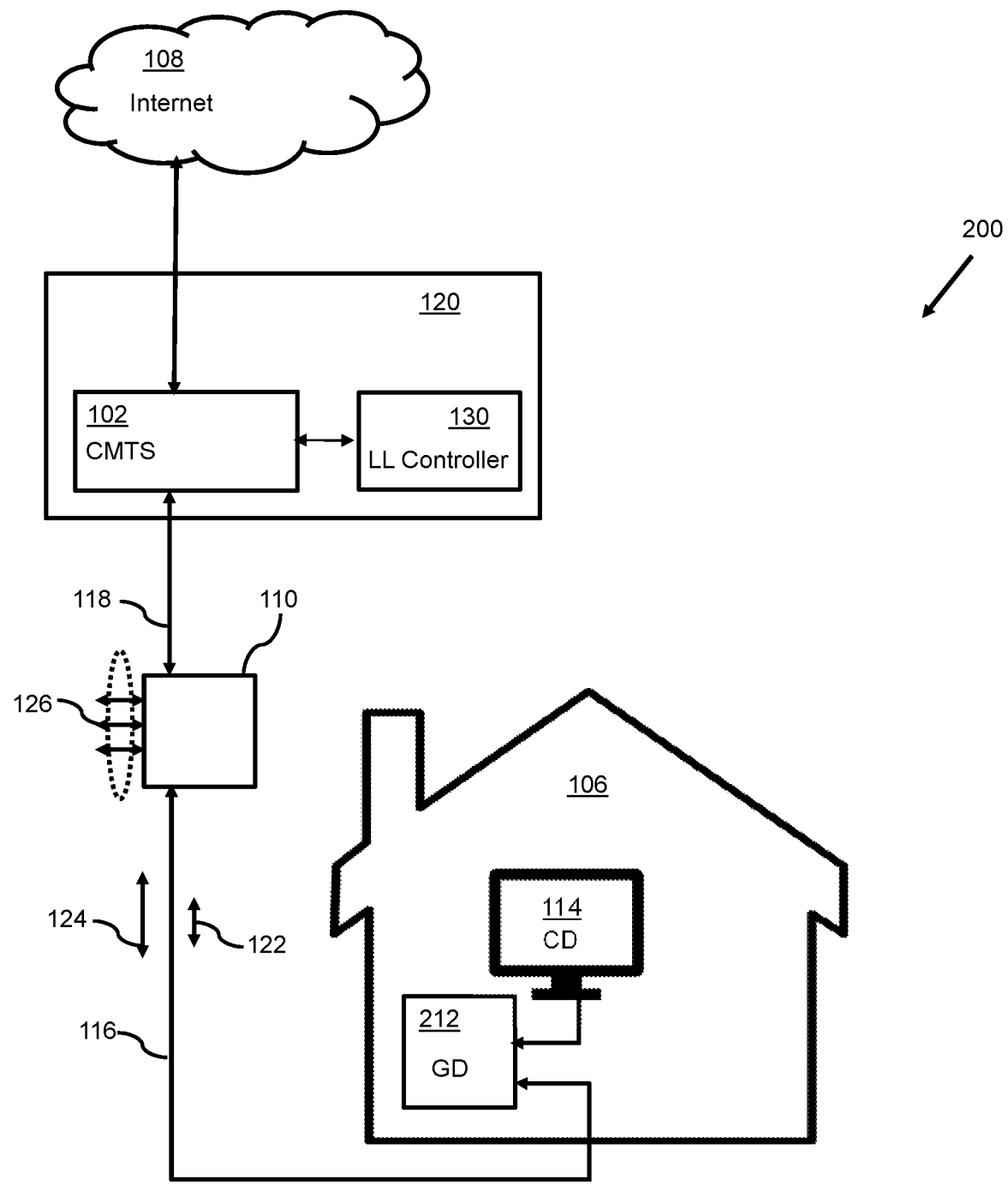
FIG. 2A illustrates an electronic communication network at a time $t_2$ in accordance with aspects of the present disclosure.

FIG. 2A illustrates an electronic communication network 200 at a time $t_2$ in accordance with aspects of the present disclosure. As shown in FIG. 2A, network 200 includes a residence 106 which includes a gateway device 212 and a client device 114; a communication channel 116; a communication channel 118; a service flow 122, which is a classic service flow; a service flow 124, which is a low latency service flow, a network node 110; a plurality of service flows 126; an MSO 120 which includes a CMTS 102 and a low latency controller 130; and an Internet 108.

Figure 2B:
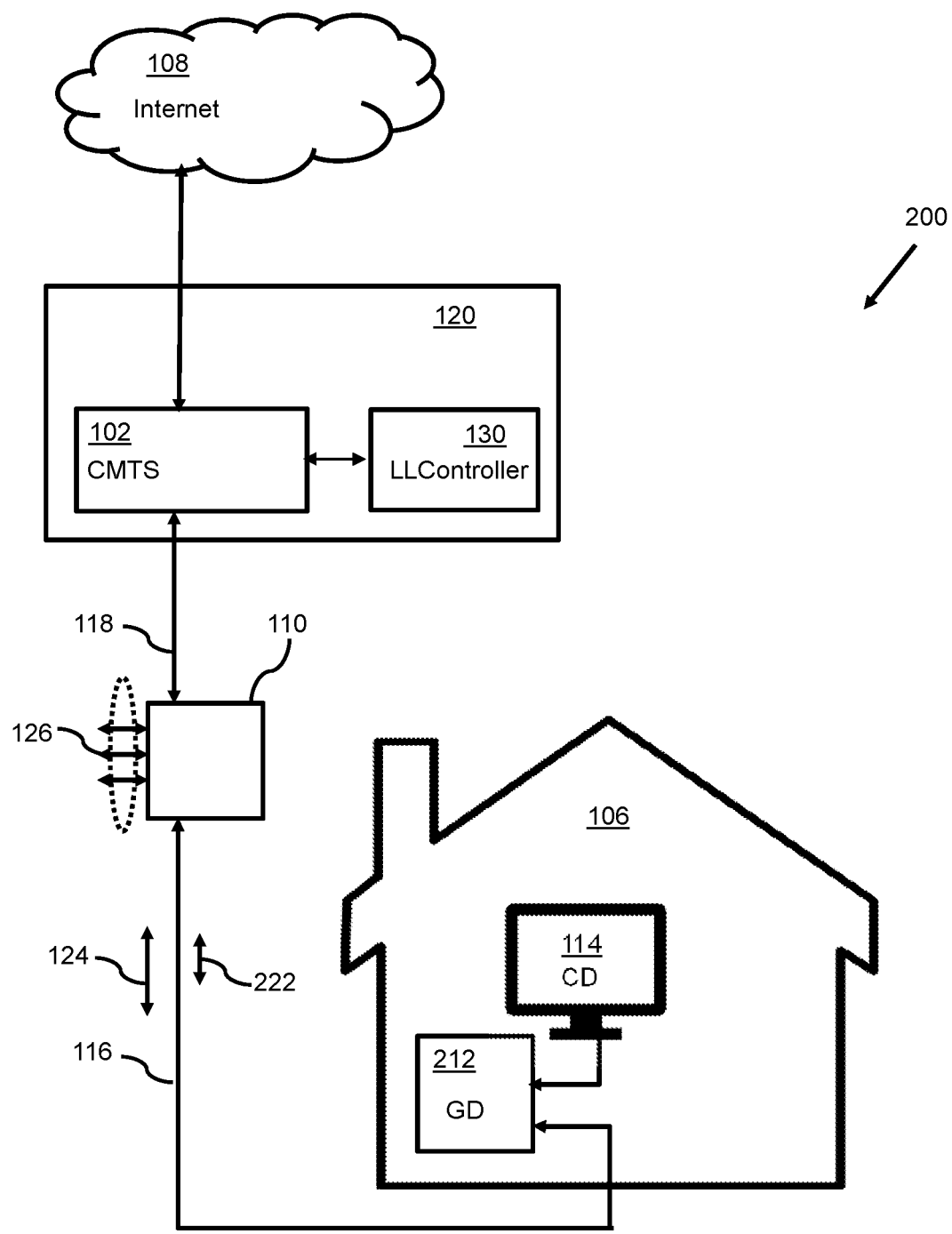
FIG. 2B further illustrates the electronic communication network of FIG. 2A at time $t_3$.

FIG. 2B further illustrates the electronic communication network 200 of FIG. 2A at time $t_3$. As shown in FIG. 2B, at time $t_3$, communication network 200 includes all of the components illustrated in FIG. 2A with the exception that service flow 122 has been replaced by service flow 222.

Figure 2C:
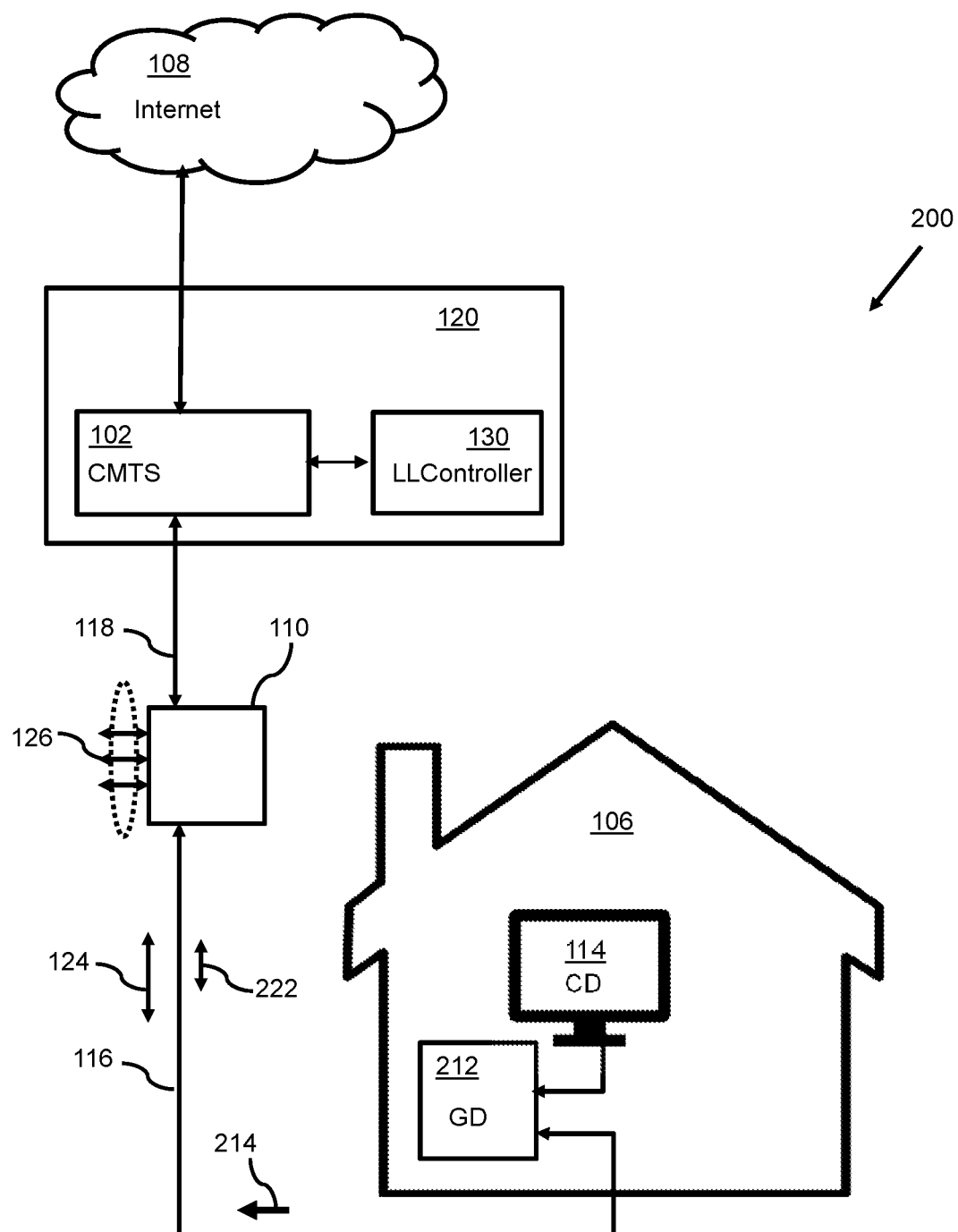
FIG. 2C further illustrates the electronic communication network of FIG. 2B at a time $t_4$.

FIG. 2C further illustrates the electronic communication network 200 of FIG. 2B at time $t_4$. As shown in FIG. 2C, at time $t_4$, network 200 includes all of the components illustrated in FIG. 2B with the addition of communication signal 214.

Figure 2D:
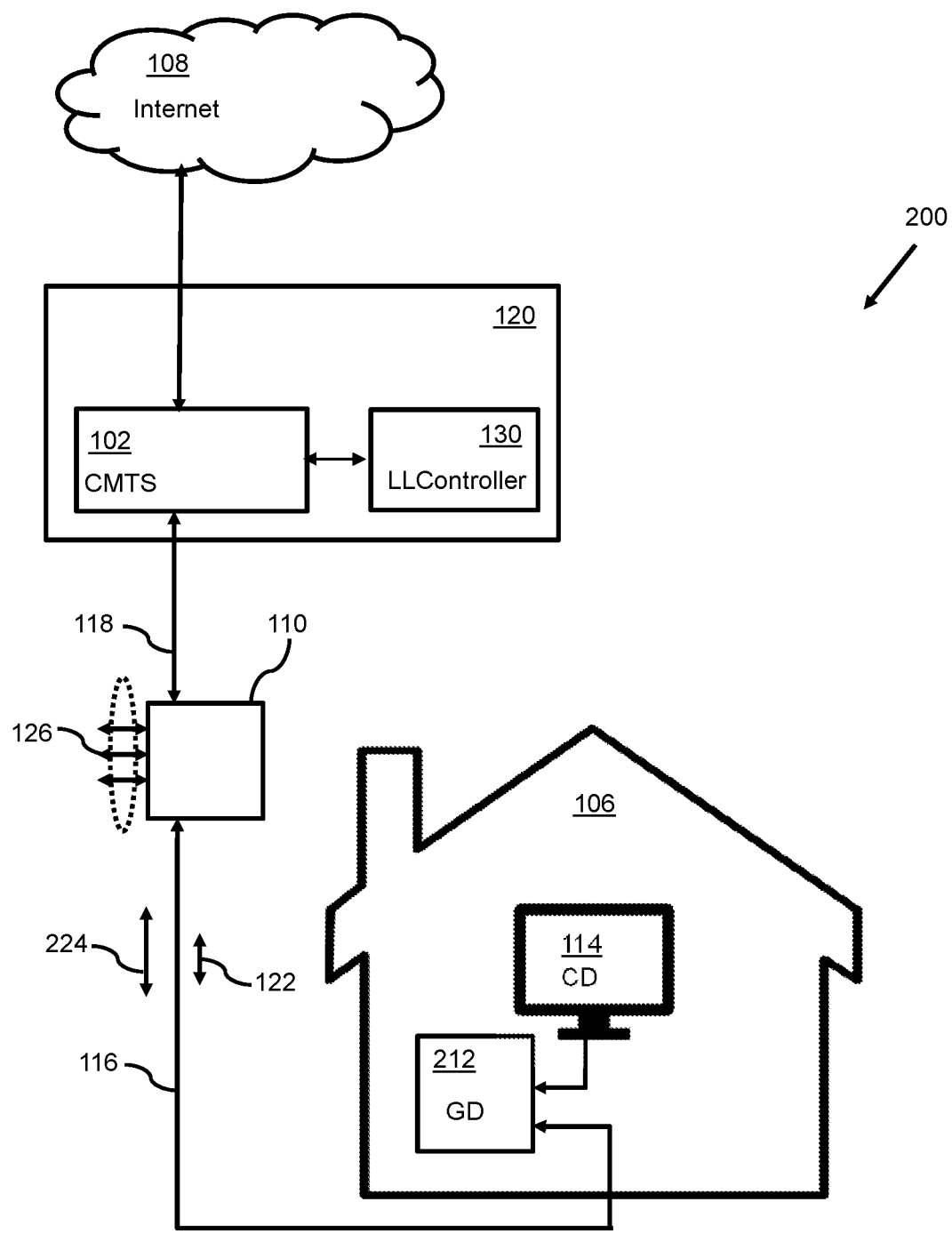
FIG. 2D further illustrates the electronic communication network of FIG. 2A at a time $t_5$.

FIG. 2D further illustrates the electronic communication network 200 of FIG. 2A at time $t_5$. As shown in FIG. 2D, at time $t_5$, network 200 includes all of the components illustrated in FIG. 2A with the exception that service flow 124 has been replaced by service flow 224.

Figure 3:
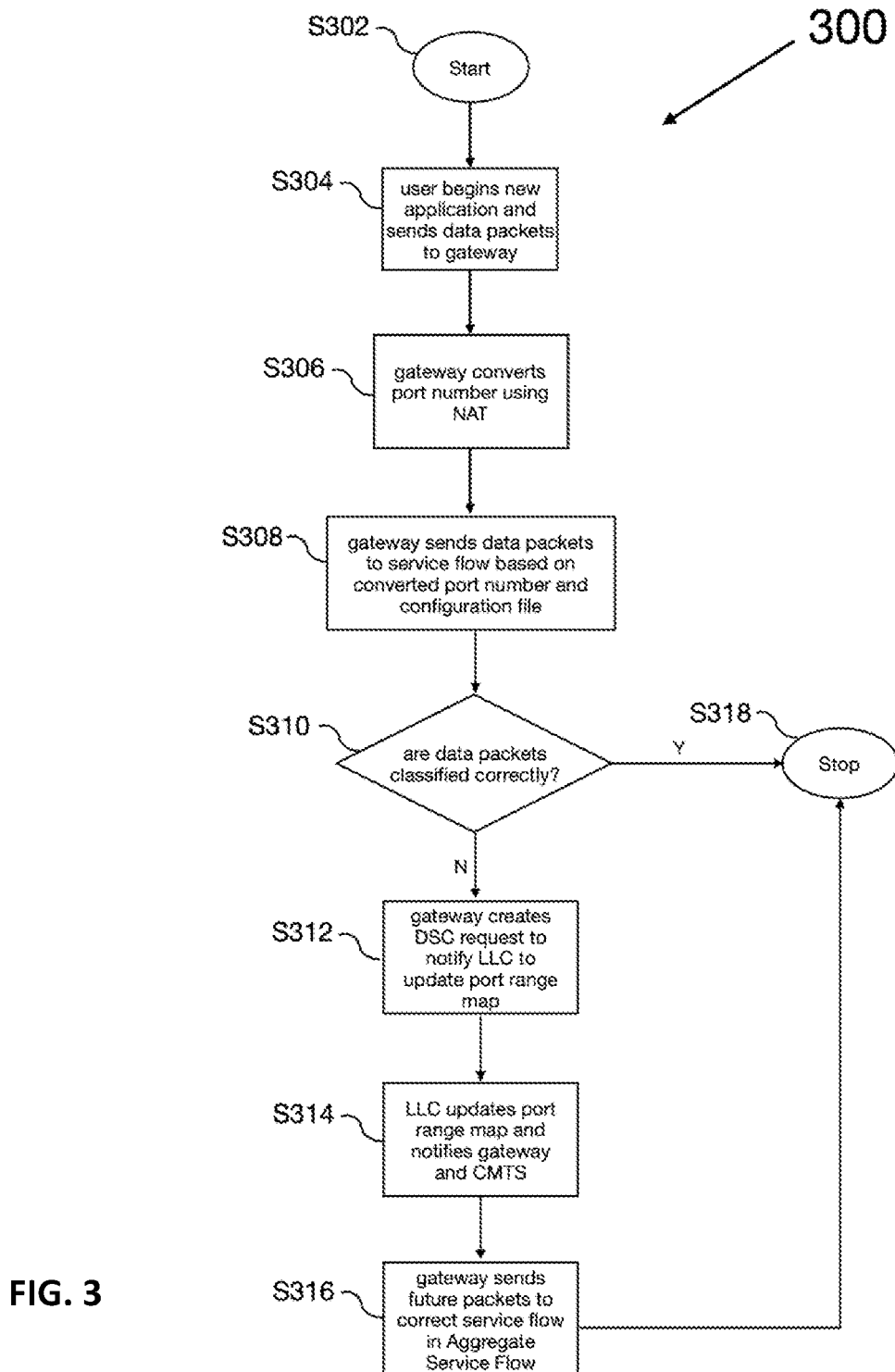
FIG. 3 illustrates an example algorithm in accordance with aspects of the present disclosure.

FIG. 3 illustrates an example algorithm 300 in which a gateway device converts a source port number using NAT and uses that converted source port number to determine if data packets require low latency or not. The gateway device may convert a source port number using NAT in any known manner, a non-limiting example of which is disclosed in US provisional patent application No. 62/967,855, filed on Jan. 30, 2020, the entire disclosure of which is incorporated herein by reference. Based on that determination, the gateway device routes the data packets to a low latency or classic service flow depending on whether or not the port number is in the range for low latency. If the data packets have been incorrectly classified, a DSC request is sent to a low latency controller to update a port range map to correctly classify future data packets.

Figure 4:
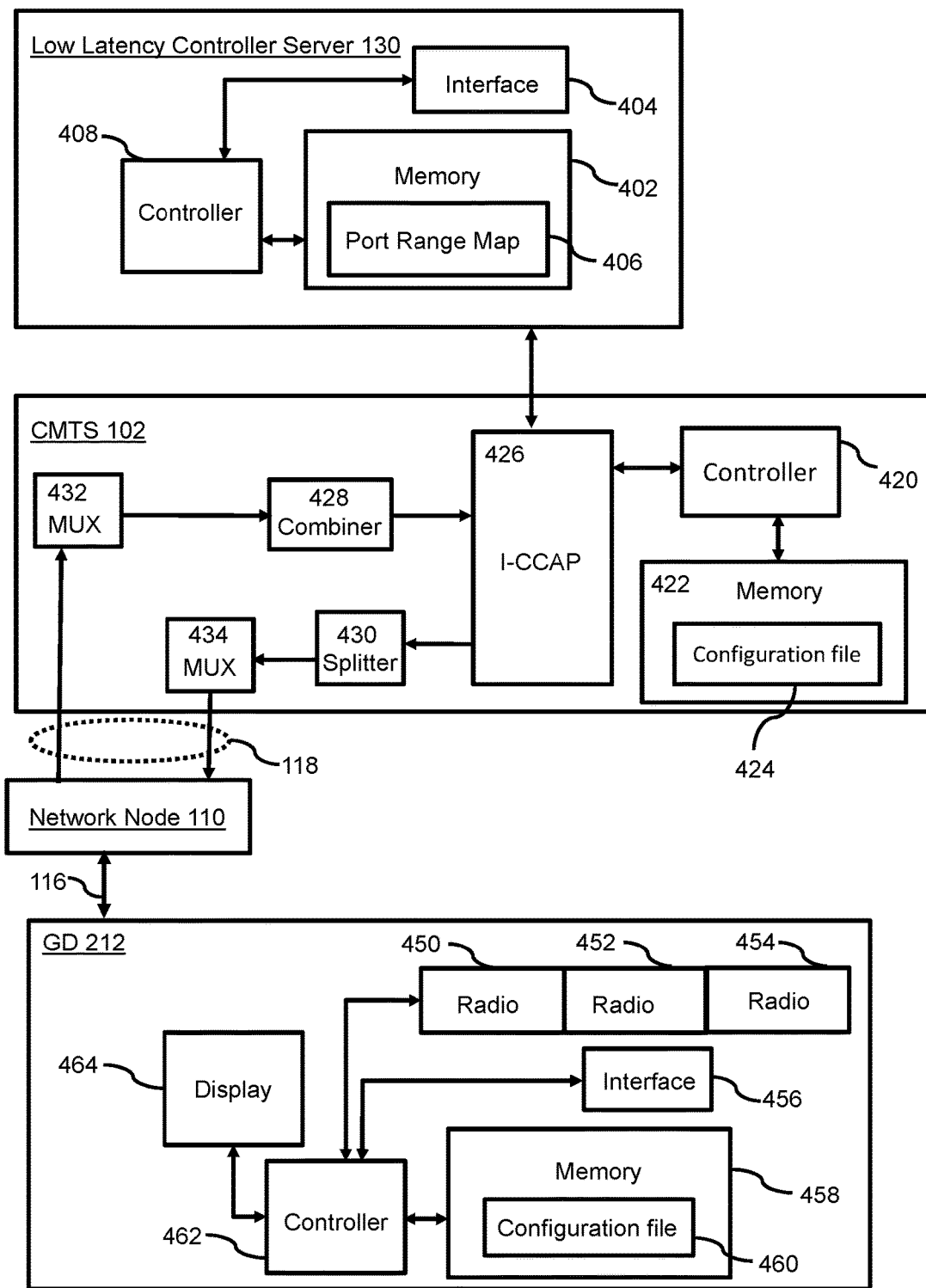
FIG. 4 illustrates an exploded view of a low latency configuration server, a CMTS, and a gateway device.

FIG. 4 illustrates an exploded view of low latency controller server 130, CMTS 102, and gateway device 212 of FIGS. 2A-D.

Gateway device 212, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 212 may be any device or system that is operable to allow data to flow from one discrete network to another, which in this example is from the LAN located within residence 106 to Internet 108. Gateway device 212 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 212 is able to communicate with MSO 120 via physical media/wiring 116 and 118, which may optionally be a wireless communication system, such as 4G, or 5G, and further is able to connect to Internet 108 via MSO 120.

MSO 120 includes head-end equipment such as server computers (e.g., automatic configuration server ACS, cable modem termination system (CMTS) that enable an MSO to provide content (such as audio/video content and/or internet service) either through physical media/wiring, such as a coaxial network, an optical fiber network, and/or DSL, or a wireless network, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g, FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Gateway device 212 serves as a gateway or access point to Internet 108 (or otherwise as mentioned above), for one or more electronic devices, referred to generally herein as client device 114. Client device 114 can be a desktop computer, laptop computer, electronic tablet device, smart phone, appliance, or any other so-called internet of things equipped device.

As shown in FIG. 4, gateway device 212 includes: a controller 462; a memory 458, which has stored therein a configuration file 460; three radios, which are illustrated as a radio 450, a radio 452, and a radio 454; a display 464; and an interface circuit 456.

In this example, controller 462, memory 458, radios 450, 452, and 454, display 464, and interface circuit 456 are illustrated as individual devices. However, in some embodiments, at least two of controller 462, memory 458, radios 450, 452, 454, and interface circuit 456 may be combined as a unitary device. Whether as individual devices or as combined devices, controller 462, memory 458, radios 450, 452, 454, and interface circuit 456 may be implemented as any combination of an apparatus, a system and an integrated circuit. Further, in some embodiments, at least one of controller 462, memory 458, and interface circuit 456 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 462 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 212 in accordance with the embodiments described in the present disclosure. Memory 458 can store various programming, and user content, and data. Interface circuit 456 can include one or more connectors, such as RF connectors, or Ethernet connectors, and/or wireless communication circuitry, such as 5G circuitry and one or more antennas. Interface circuit 456 receives content from MSO 120 (as shown in FIG. 2A) by known methods, non-limiting examples of which include terrestrial antenna, satellite dish, wired cable, DSL, optical fibers, or 5G as discussed above. Through interface circuit 456, gateway device 212 receives an input signal, including data and/or audio/video content, from MSO 120 and can send data to MSO 120.

Radios 450, 452, and 454 may also be referred to as a wireless communication circuit, such as a Wi-Fi WLAN interface radio transceiver, and are operable to communicate with client device 114. Radios 450, 452, and 454 include one or more antennas and communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Gateway device 212 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Insofar as gateway device 212 provides connection to MSO 120, gateway device 212 can be equipped with connectors to connect with a television or display device, and can also include programming to execute an electronic program guide and/or other suitable graphical user interface (GUI), and can with such configuration be referred to as a so-called set top box. Such a set top box can be included in the system shown in FIG. 2A as gateway device 212 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the cable modem to be a so-called smart media device.

CMTS 102 includes: a controller 420, a memory 422, which has stored therein a configuration file 424, an I-CCAP 426, a combiner 428, a splitter 430, an upstream MUX 432, and a downstream MUX 434.

In this example, controller 420, memory 422, I-CCAP 426, combiner 428, splitter 430, upstream MUX 432, and downstream MUX 434 are illustrated as individual devices. However, in some embodiments, they may be combined as a unitary device. Further, in some embodiments, controller 420 and memory 422 may be implemented as a computer having tangible computer-readable media for carrying or having computer-executable instructions or data structures stored thereon.

Controller 420 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of CMTS 102 in accordance with the embodiments described in the present disclosure.

Memory 422 can store various programming, user content, and data.

I-CCAP 508 is a platform which integrates multiple functions including a Data Over Cable Service Interface Specification (DOC SIS) cable modem termination system (CMTS), broadcast video Quadrature Amplitude Modulation (QAM) standard, Video On-Demand (VOD) Edge QAMs (EQAMS), and Set-top Box (STB) Out-Of-Band control. I-CCAP 426 provides broadband data for each cable modem as an RF signal with a spectrum of frequencies.

Combiner 428 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving RF signals from upstream MUX 432, combining and splitting RF signals as necessary, and transmitting them as a single RF signal to I-CCAP 426.

Splitter 430 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving multiple RF signals from I-CCAP 426 plus other RF signals from other sources in the broadband data provider facility; and then splitting and combining the RF signals to effectively route them to downstream MUX 434.

Upstream MUX 432 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving an optical signal from network node 110 and then de-multiplexing and receiving (RX) the optical signal into separate RF signals for transmission to combiner 428.

Downstream MUX 434 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for receiving the RF signals from splitter 430 and then optically transmitting (TX) and multiplexing the RF signals together on multiple wavelengths for transmission as a single signal to network node 110. Therefore, the signal from downstream MUX 434 on communication line 118 is a collection of one or more service flow data signals.

Low latency controller server 130 includes: a controller 408; a memory 402, which has stored therein a port range map 406; and an interface circuit 404.

In this example, controller 408 and memory 402 are illustrated as individual devices. However, in some embodiments, at least two of controller 408 and memory 402 may be combined as a unitary device. Further, in some embodiments, at least one of controller 408 and memory 402 may be implemented as a computer having tangible computer-readable media for carrying or having computer-executable instructions or data structures stored thereon.

Controller 408 may be implemented as hardware circuitry such as a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of low latency controller server 130 in accordance with the embodiments described in the present disclosure.

Memory 402 can store various programming, and user content, and data.

As will be described in more detail below, controller 462 is configured to execute instructions stored on memory 458 to cause gateway device 212 to: provide a local area network ("LAN") for connection to gateway device 212; provide a network address translation ("NAT") having a network device IP address, a client device IP address, a destination port, and a plurality of source ports. The network device IP address is associated with gateway device 212. The client device IP address is associated with the client device. The destination port is associated with the client device. The NAT is configured to map the IP address of gateway device 212 to the client device IP address for the packets from CMTS 102 to the client device and to map the client device IP address to the IP address of gateway device 212 for packets from the client device to CMTS 102; divide the source ports into a first range of source ports and a low latency range of source ports, the first range of source ports being mapped to the first service flow, the low latency range of source ports being mapped to the second service flow; assign the respective data traffic of the n applications to at least one port within the first range of source ports; assign the respective data traffic of the m applications to at least one port within the low latency range of source ports; and modify the low latency range of source ports based on a change in data traffic of at least one of n and m.

As will be described in more detail below, controller 462 is configured to execute instructions stored on memory 458 to additionally cause gateway device 212 to transmit a dynamic service change signal to CMTS 102 based on the change in data traffic of at least one of n and m.

As will be described in more detail below, controller 462 is configured to execute instructions stored on memory 458 to additionally cause gateway device 212 to transmit the dynamic service change signal to CMTS 102 by one of the group of communication protocols consisting of a TR-069 protocol and a simple network management protocol.

Returning to FIG. 3, algorithm 300 to be executed by a processor starts (S302), and a user begins a new application and sends data packets to a gateway (S304). For example, returning to FIG. 2A, at time $t_2$, assume that the user of client device 114 has two concurrently running applications open. Assume that application A, running on client device 114, is an application that does not require low latency and is transmitting data packets through service flow 122, and assume that application B, running on client device 114, is an application that does require low latency, and is transmitting data packets through service flow 124. And assume that all of the ports assigned by gateway device 212 for low latency data traffic have been exhausted by application B.

Then, returning to FIG. 2B, at time $t_3$, assume that the user of client device 114 opens a third application, application C, while applications A and B are open and running on client device 114. Assume also that application C is also an application that requires low latency for optimal performance. This will now be discussed with reference to FIGS. 2B-4.

Returning to FIG. 3, after a user begins a new application and sends data packets to a gateway (S304), the gateway converts the source port number for the application using NAT (S306). For example, returning to FIG. 2B, after the user of client device 114 begins application C and sends packets to gateway device 212, gateway device 212 converts the source port numbers for application C using NAT. For example, returning to FIG. 4, gateway device 212 uses configuration file 460 to convert the source port numbers for application C using NAT. In this example, since all port numbers for low latency applications have been exhausted by application B, application C is assigned port numbers that are not in the range for low latency applications.

Returning to FIG. 3, after the gateway converts the source port numbers using NAT (S306), the gateway sends the data packets to the service flow based on the converted port numbers and configuration file (S308). For example, returning to FIG. 2B, after gateway device 212 converts the port numbers for application C using NAT, gateway device 212 sends the data packets for application C to the classic service flow because application C was assigned port numbers in the range for the classic service flow. In FIG. 2B, the addition of data packets from application being sent through the classic service flow is illustrated by the change in number for the classic service flow from 122 in FIG. 2A to 222 in FIG. 2B.

Returning to FIG. 3, after the gateway sends the data packets to the service flow based on the converted port number and configuration file (S308), it is determined if the data packets are classified correctly (S310). For example, returning to FIG. 2B, after gateway device 212 sends the data packets for application C to the classic service flow, as represented by signal 222, gateway device 212 determines if the data packets for application C are classified correctly. In this example, since application C requires low latency for optimal performance and it was assigned port numbers for the classic service flow, gateway device 212 determines that the data packets for application C were not properly classified.

Returning to FIG. 3, if it is determined that the data packet is classified correctly (Y at S310), the algorithm ends (S318).

Returning to FIG. 3, if it is determined that the data packets are not classified correctly (N at S310), the gateway creates a DSC request to notify the low latency controller (LLC) to update the port range map (S312). For example, returning to FIG. 2C, since gateway device 212 determined that the data packets for application C were not correctly classified, gateway device 212 creates a DSC request, illustrated as communication signal 214, to notify low latency controller server 130 to update the port range map to specify that the ports used by application C are ports used for low latency traffic. For example, returning to FIG. 4, gateway device 212 sends a DSC request to low latency controller server 130 to update port range map 406 to include the ports used by application C as ports used for low latency traffic. In some embodiments, the DSC request can be sent by a TR-069 or simple network management protocol. In other embodiments, the DSC request can be sent by a proprietary protocol.

Returning to FIG. 3, after the gateway creates a DSC request to notify the LLC to update the port range map (S312), the low latency controller updates the port range map and notifies the gateway and the CMTS (S314). For example, returning to FIG. 4, after gateway device 212 creates a DSC request to notify low latency controller server 130 to update port range map 406, low latency controller server 130 updates port range map 406 and sends a notification to gateway device 212 to update configuration file 460 and CMTS 102 to update configuration file 424.

Returning to FIG. 3, after the low latency controller updates the port range map and notifies the gateway and the CMTS (S314), the gateway sends future packets to the correct service flow in the Aggregate Service Flow (S316). For example, returning to FIG. 2D, at time $t_5$, future data packets from application C are sent to the low latency service flow as illustrated by the new service flow numbers 122 and 224. Service flow 122, carrying data traffic requiring a classic service flow, has been restored to its original state. And the service flow carrying low latency traffic is now carrying data traffic from application C. This is illustrated by the service flow number changing from 124 in FIGS. 2A-C to 224 in FIG. 2D. For example, returning to FIG. 4, after low latency controller server 130 updates port range map 406 and sends a notification to gateway device 212 to update configuration file 460 and CMTS 102 to update configuration file 424, gateway device 212 sends future data packets from application C to the low latency service flow in the Aggregate Service Flow.

Returning to FIG. 3, after the gateway sends future packets to the correct service flow in the Aggregate Service Flow (S316), the algorithm ends (S318). For example, returning to FIG. 4, after gateway device 212 sends future data packets from application C to the low latency service flow in the Aggregate Service Flow, algorithm 300 ends.

Many modern applications, such as online gaming, are latency-sensitive. To provide the best quality of service for low latency applications, data traffic over CATV networks is separated into a low latency service flow and a classic service flow. This separation takes place through a classification that is established by an MSO and/or ISP. The classification maps data traffic from low latency applications onto a low latency service flow and it maps data traffic from all other applications onto a classic service flow. There are times when these classifications established by the ISPs and/or MSOs for use with a gateway device need to be modified. If the existing port range that is provisioned in the gateway device for low latency data traffic needs to be changed, it requires intervention by the MSO and/or the ISP and a possible reboot of the gateway device, which is time-consuming and very inconvenient for the consumer.

What is needed is a system to automatically detect and classify low latency traffic and modify the classifiers provisioned in the gateway device as needed to accommodate low latency data traffic and send it through the low latency service flow without intervention from the user, the ISP, or the MSO.

A system and a method in accordance with aspects of the present disclosure solves the problem of needing to modify a port range map and data traffic classification for low latency traffic without intervention by an ISP, a user, or an MSO. A low latency controller is provisioned at an MSO. The low latency controller contains a port range map which defines a range of source ports to be used for applications requiring low latency and a source port range for applications that do not require low latency. When the gateway device indicates the data traffic for an application has been improperly classified, it notifies the low latency controller through a DSC request. The low latency controller then updates its port range map with the proper classification for the application and sends the updated information to the gateway device and the CMTS. The data packets for the new application are then properly classified and sent through the correct service flow, and the user experiences greatly improved performance with their application.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A network device for use with a client device and a cable modem termination system ("CMTS"), the client device being configured to run a non-negative integer number n applications and to run a non-negative integer number m applications, the n applications requiring respective data traffic of a first quality of service ("QoS"), the m applications requiring respective data traffic of a second QoS, the second quality of service being higher than the first quality of service, the CMTS being configured to provide a first service flow to the network device and to provide a second service flow to the network device, the first service flow being associated with the first QoS, the second service flow being associated with the second QoS, said network device comprising:

a memory; and
a processor configured to execute instructions stored on said memory to cause said network device to:
provide a local area network ("LAN") for connection to the client device;
provide a network address translation ("NAT") having a network device IP address, a client device IP address, a destination port, and a plurality of source ports, the IP address being associated with said network device, the client device IP address being associated with the client device, the destination port being associated with the client device, the NAT being configured to map the network device IP address to the client device IP address for the packets from the CMTS to the client device and to map the client device IP address to the network IP address for packets from the client device to the CMTS;

divide the source ports into a first range of source ports and a second range of source ports, the first range of source ports being mapped to the first service flow, the second range of source ports being mapped to the second service flow;
assign the respective data traffic of the n applications to at least one port within the first range of source ports;
assign the respective data traffic of the m applications to at least one port within the second range of source ports; and
modify the second range of source ports based on a change in data traffic of at least one of n and m.

2. The network device of claim 1, wherein said processor is configured to execute instructions stored on said memory to additionally cause said network device to transmit a dynamic service change signal to the CMTS based on the change in data traffic of at least one of n and m.

3. The network device of claim 2, wherein said processor is configured to execute instructions stored on said memory to additionally cause said network device to transmit the dynamic service change signal to the CMTS by one of the group of communication protocols consisting of a TR-069 protocol and a simple network management protocol.

4. The network device of claim 2, wherein the dynamic service change signal instructs the CMTS to modify at least one of the first service flow and the second service flow.

5. The network device of claim 2, wherein the dynamic service change signal instructs the CMTS to modify a classifier that classifies the second service flow.

6. The network device of claim 1, wherein the first range of source ports is mutually exclusive from the second range of source ports.

7. The network device of claim 1, wherein the change in data traffic comprises a change in at least one of n and m.

8. A method of using a network device with a client device and a cable modem termination system ("CMTS"), the client device being configured to run a non-negative integer number n applications and to run a non-negative integer number m applications, the n applications requiring respective data traffic of a first quality of service ("QoS"), the m applications requiring respective data traffic of a second QoS, the second quality of service being higher than the first quality of service, the CMTS being configured to provide a first service flow to the network device and to provide a second service flow to the network device, the first service flow being associated with the first QoS, the second service flow being associated with the second QoS, said method comprising:

providing, via a processor configured to execute instructions stored on a memory, a local area network ("LAN") for connection to the client device;
providing, via the processor, a network address translation ("NAT") having a network device IP address, a client device IP address, a destination port, and a plurality of source ports, the IP address being associated with said network device, the client device IP address being associated with the client device, the destination port being associated with the client device, the NAT being configured to map the network device IP address to the client device IP address for the packets from the CMTS to the client device and to map the client device IP address to the network IP address for packets from the client device to the CMTS;
dividing, via the processor, the source ports into a first range of source ports and a second range of source ports, the first range of source ports being mapped to the first service flow, the second range of source ports being mapped to the second service flow;

assigning, via the processor, the respective data traffic of the n applications to at least one port within the first range of source ports;

assigning, via the processor, the respective data traffic of the m applications to at least one port within the second range of source ports; and modifying, via the processor, the second range of source ports based on a change in data traffic of at least one of n and m.

9. The method of claim 8, further comprising transmitting, via the processor, a dynamic service change signal to the CMTS based on the change in data traffic of at least one of n and m.

10. The method of claim 9, wherein said transmitting comprises transmitting the dynamic service change signal to the CMTS by one of the group of communication protocols consisting of a TR-069 protocol and a simple network management protocol.

11. The method of claim 9, wherein the dynamic service change signal instructs the CMTS to modify at least one of the first service flow and the second service flow.

12. The method of claim 8, wherein the dynamic service change signal instructs the CMTS to modify a classifier that classifies the second service flow.

13. The method of claim 8, wherein the first range of source ports is mutually exclusive from the second range of source ports.

14. The method of claim 8, wherein the change in data traffic comprises a change in at least one of n and m.

15. A non-transitory, computer-readable media having computer-readable instructions stored thereon, the computer-readable instructions being capable of being read by a network device for use with a client device and a cable modem termination system ("CMTS"), the client device being configured to run a non-negative integer number n applications and to run a non-negative integer number m applications, the n applications requiring respective data traffic of a first quality of service ("QoS"), the m applications requiring respective data traffic of a second QoS, the second quality of service being higher than the first quality of service, the CMTS being configured to provide a first service flow to the network device and to provide a second service flow to the network device, the first service flow being associated with the first QoS, the second service flow being associated with the second QoS, wherein the computer-readable instructions are capable of instructing the network device to perform the method comprising:

providing, via a processor configured to execute instructions stored on a memory, a local area network ("LAN") for connection to the client device;

providing, via the processor, a network address translation ("NAT") having a network device IP address, a client device IP address, a destination port, and a plurality of source ports, the IP address being associated with said network device, the client device IP address being associated with the client device, the destination port being associated with the client device, the NAT being configured to map the network device IP address to the client device IP address for the packets from the CMTS to the client device and to map the client device IP address to the network IP address for packets from the client device to the CMTS;

dividing, via the processor, the source ports into a first range of source ports and a second range of source ports, the first range of source ports being mapped to the first service flow, the second range of source ports being mapped to the second service flow;

assigning, via the processor, the respective data traffic of the n applications to at least one port within the first range of source ports;

assigning, via the processor, the respective data traffic of the m applications to at least one port within the second range of source ports; and modifying, via the processor, the second range of source ports based on a change in data traffic of at least one of n and m.

16. The non-transitory, computer-readable media claim 15, wherein the computer-readable instructions are capable of instructing the network device to perform the method further comprising transmitting, via the processor, a dynamic service change signal to the CMTS based on the change in data traffic of at least one of n and m.

17. The non-transitory, computer-readable media claim 16, wherein the computer-readable instructions are capable of instructing the network device to perform the method wherein said transmitting comprises transmitting the dynamic service change signal to the CMTS by one of the group of communication protocols consisting of a TR-069 protocol and a simple network management protocol.

18. The non-transitory, computer-readable media claim 16, wherein the computer-readable instructions are capable of instructing the network device to perform the method wherein the dynamic service change signal instructs the CMTS to modify at least one of the first service flow and the second service flow.

19. The non-transitory, computer-readable media claim 16, wherein the computer-readable instructions are capable of instructing the network device to perform the method wherein the dynamic service change signal instructs the CMTS to modify a classifier that classifies the second service flow.

20. The non-transitory, computer-readable media claim 15, wherein the computer-readable instructions are capable of instructing the network device to perform the method wherein the first range of source ports is mutually exclusive from the second range of source ports.

21. The non-transitory, computer-readable media claim 15, wherein the computer-readable instructions are capable of instructing the network device to perform the method wherein the change in data traffic comprises a change in at least one of n and m.

* * * * *